UNITED STATES PATENT OFFICE.

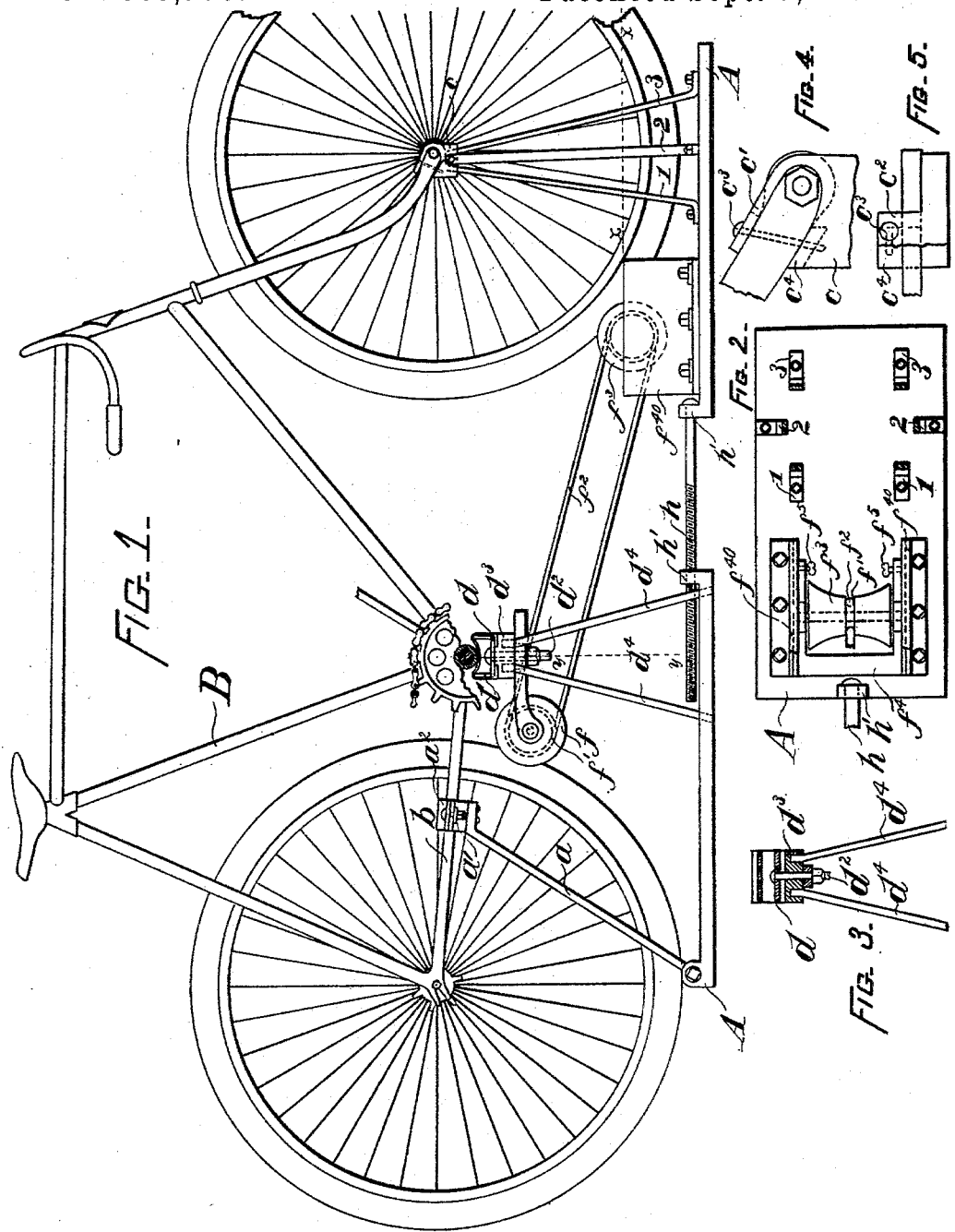

MICHAEL J. DWYER, OF CAMBRIDGE, MASSACHUSETTS.

BICYCLE TRAINING-MACHINE.

SPECIFICATION forming part of Letters Patent No. 589,705, dated September 7, 1897.

Application filed July 8, 1896. Serial No. 598,378. (No model.)

*To all whom it may concern:*

Be it known that I, MICHAEL J. DWYER, of Cambridge, county of Middlesex, State of Massachusetts, have invented an Improvement in Cycle-Supports and Exercising Apparatus, of which the following description, in connection with the accompanying drawings, is a specification, like letters on the drawings representing like parts.

This invention has for its object to improve the construction of a bicycle-support and exercising apparatus whereby the cycle may be supported in an elevated position and when so supported may be operated in the usual way—that is to say, by operating the pedals both wheels will be revolved.

The invention consists in a bicycle-support comprising a pair of uprights or arms adapted to support the rear of the machine, a pair of uprights or arms adapted to support the front of the machine, and an intermediate upright or support which receives and supports the frame of the machine at a point beneath the crank-hanger. The said uprights or arms are and preferably will be secured to a base-plate which is made up of two sections adjustably connected together. The said intermediate upright or support has at its upper end a block upon which the frame of the machine rests, having a rubber or other face to prevent injuring the frame at point of contact.

The invention also consists in an exercising attachment or device which is secured to said bicycle-support and which comprises two adjustable friction pulleys or rolls connected together by a belt, the main or driving pulley bearing against the tire of the driving-wheel of the cycle and the other pulley bearing against the tire of the front wheel of the cycle, so that said front wheel will be revolved by the rear wheel. By adjustment of said friction pulleys or rolls more or less into engagement with the tires of the wheels a resistance is produced which may be varied at will, so that a person may feel the same resistance as when riding upon the road; and the invention also consists in details of construction to be hereinafter described.

Figure 1 shows a side elevation of my improved bicycle-supporting device and exercising attachment with a bicycle supported thereon. Fig. 2 is a plan view and partial section taken on the dotted line $xx$, Fig. 1. Fig. 3 is a vertical section of the intermediate support, taken on the dotted line $yy$, Fig. 1. Fig. 4 is a detail showing the device by which the front fork of the bicycle is secured to the upwardly-projecting arms of the bicycle-supporting device. Fig. 5 is a plan view of the parts shown in Fig. 4.

B represents a bicycle of any ordinary construction which is supported by my improved bicycle-supporting device. This device consists of a pair of upwardly-projecting arms $a$, which are or may be secured at their lower ends to one part of an adjustable base-plate A, said arms rising one at each side of the rear wheel of the cycle B and said arms have secured upon their upper end blocks $a'$, grooved to receive the lower longitudinal members $b'$ of the rear end of the frame of the bicycle B, said blocks $a'$ having a grooved cap $a^2$, which fits over and upon said lower longitudinal members $b'$ of the bicycle-frame and may be secured to said blocks $a'$ by bolts passing through two laterally-projecting flanges formed upon said blocks $a'$, and thence through similar flanges projecting laterally from the blocks $a'$, where said bolts receives a nut and washer. Said arms $a$ are preferably adjustably secured to said base-plate A, so as to accommodate bicycle-frames of different heights.

The arms $a$ are herein shown as pivoted to ears on the base-plate and held in any desired position of adjustment by a bolt and nut. By turning said arms on their pivots the ends thereof may be raised and lowered, and also said arms may when desired be turned down out of the way.

At the forward end of the wheel a pair of similar upwardly-projecting arms are located, each of which is shown as comprising three members 1 2 3, disposed, respectively, on each side of the wheel, as shown in Fig. 2. The upper ends of said members 1 2 3 are secured to a block $c$, which has a portion $c'$ adapted to partially embrace the nut which is secured to the end of the axle of the front wheel of the bicycle B, and said portion $c'$ on the block $c$ is cut away to present a laterally-projecting portion $c^3$, which overlaps the front fork near its end, (see Figs. 4 and 5,) and a like laterally-projecting portion $c^4$ is formed upon the inner side of the block c directly below said laterally-projecting portion $c^3$, a pin $c^3$ projecting through the portion $c^2$, thence down between the inner side of said front fork and the spoke of the front wheel, and thence through the laterally-projecting portion $c^4$. The pin $c^3$ thus holds said block against displacement and with the block holds the front end of the machine.

The intermediate support, which receives and supports the greatest weight, comprises, essentially, four legs $d^4$, the upper ends of which are set into a block $d^3$, and upon said block a plate $d$ is secured having at each side an upwardly-extended portion and over which may be stretched a rubber or leather strip, the edges of which may be secured to said plate, and thus forming a yielding bearing or cushion upon which rests the part of the bicycle-frame directly beneath the pedal-shaft, the leather or like material preventing the frame from abrasion, and a bolt $d^2$ passes through said plate $d$ and through the block $d^3$.

To the block $d^3$ a rearwardly-extended arm is attached by said bolt $d^2$, and a friction roll or pulley $f$ is secured to a shaft having its bearings in said arm, and said friction roll or pulley $f$ is adapted to bear against and frictionally engage the tire of the rear wheel of the bicycle B, so that when said rear wheel is revolved in usual manner said friction roll or pulley $f$ will also revolve.

The friction roll or pulley $f$ has a groove $f'$, (see Fig. 2,) which receives a belt $f^3$, which passes around or over said friction roll or pulley, said groove being deep enough to allow the belt to seat and run therein without coming in contact with the tire of the wheel. The belt $f^2$ leads to a similar grooved friction roll or pulley $f^3$, journaled in a frame $f^4$, arranged to slide in guideways formed in two uprights $f^{10}$, preferably secured to the base-plate A. The frame $f^4$ is adjustable to vary the pressure between said friction roll or pulley $f^3$ and is clamped in any position of adjustment by thumb-screws $f^5$, which bear against the said guideways formed in the two uprights $f^{10}$.

The base-plate A may be made longitudinally adjustable by providing a threaded rod $h$, which passes through threaded holes in ears $h'$, projecting upwardly from said base-plate A, so that wheels having frames of different lengths can be supported, and, if desired, said base-plate A can be lengthened, so that a tandem or other cycle can be supported by said frame.

The uprights or arms instead of being composed of several legs, as shown, may be simply a casting or may be constructed in any other suitable way.

I claim—

1. A bicycle-support consisting of adjustable uprights on opposite sides of the bicycle adapted to support the weight of the rear end of the same, and uprights on opposite sides of the bicycle adapted to support the front end of the same, having blocks at their upper ends which partially embrace the nuts on the axle of the wheel, each of said blocks provided with lateral projections which partially embrace the forks of the bicycle and a pin adapted to pass through said projections on the inside of said forks, substantially as described.

2. A bicycle-support consisting of uprights adapted to support the weight of the rear end of the bicycle, uprights adapted to support the weight of the front end of the bicycle and an intermediate upright adapted to support the weight of the bicycle directly beneath the crank-hanger said intermediate upright having a block at the upper end provided with a plate having upwardly-projecting sides, and a piece of flexible material stretched over said sides, having its ends secured, substantially as described.

3. In a bicycle exercising apparatus, uprights adapted to support the rear end of the bicycle in elevated position, and uprights adapted to support the front end of a bicycle in elevated position, and an intermediate upright adapted to support the bicycle directly beneath the crank-hanger, a coöperative part of which is made yielding to accommodate the spring of the frame.

4. In a bicycle exercising apparatus, uprights adapted to support the rear end of the bicycle in elevated position, uprights adapted to support the front end of a bicycle in elevated position, and an intermediate upright adapted to support the bicycle beneath its crank-hanger having an opening through it, a pair of friction-rollers and a belt connecting them, located between the wheels of the bicycle with the friction-rollers in contact with the tires of the said wheels, said belt passing through the opening provided in said intermediate support, substantially as described.

In testimony whereof I have signed my name to this specification in the presence of two subscribing witnesses.

MICHAEL J. DWYER.

Witnesses:
MARY SUHR,
B. J. NOYES.